United States Patent [19]
White

[11] 3,916,505
[45] Nov. 4, 1975

[54] METHOD OF MAKING FLEXIBLE HOSE
[75] Inventor: Joseph White, Didsbury, England
[73] Assignee: Compoflex Company Limited, England
[22] Filed: July 5, 1974
[21] Appl. No.: 486,084

Related U.S. Application Data
[62] Division of Ser. No. 145,392, May 20, 1971, Pat. No. 3,835,891.

[30] Foreign Application Priority Data
June 2, 1970   United Kingdom............... 26636/70

[52] U.S. Cl. ..................... 29/456; 29/505; 156/143
[51] Int. Cl.² ......................................... B23P 11/00
[58] Field of Search .......... 29/456, 505; 156/143 X, 156/144; 138/125, 129, 137, 143

[56] References Cited
UNITED STATES PATENTS
| | | | |
|---|---|---|---|
| 3,205,913 | 9/1965 | Ehlers | 138/125 |
| 3,279,502 | 10/1966 | Waddell | 138/125 X |
| 3,599,677 | 8/1971 | O'Brien | 138/137 X |

FOREIGN PATENTS OR APPLICATIONS
| | | | |
|---|---|---|---|
| 588,858 | 6/1947 | United Kingdom | 156/143 |
| 591,307 | 8/1947 | United Kingdom | |

Primary Examiner—Charlie T. Moon
Attorney, Agent, or Firm—Cushman, Darby & Cushman

[57] ABSTRACT

The invention relates to a hose or tube which has an inner lining which consists of an inner helical wire with at least one layer of fluorinated ethylene propylene copolymer superposed thereon. The inner wire is preferably coated with fluorinated ethylene propylene copolymer or polytetrafluoroethylene. For the conveyance of chemicals layers of polypropylene fabric and polypropylene film are laid on the copolymer and for the conveyance of high temperature substances asbestos cloth and polypropylene fabric. The whole is encased in an outer cover coated with PVC and surrounded by wire.

3 Claims, 2 Drawing Figures

METHOD OF MAKING FLEXIBLE HOSE

This is a division of application Ser. No. 145,392 filed May 20, 1971, now U.S. Pat. No. 3,835,971.

This invention relates to improvements in flexible hose or tubing and is particularly concerned with hose for the conveyance of chemical liquids and other substances. It is accordingly an object of the invention to provide a hose which will resist the corrosive and other effects of the chemical substances to be conveyed therein and at the same time possess strength and be resistant to crush.

In accordance with the invention the inner lining of the hose consists of a wire spiral on which is superposed a layer or layers of fluorinated ethylene propylene copolymer. The wire spiral may be formed of stainless steel or wire covered with fluorinated ethylene propylene copolymer or polytetrafluoroethylene. The inner lining positioned over the wire spiral preferably consists of fluorinated ethylene propylene layflat tubing which is either extruded or welded from sheet to form tubing. The expression "layflat" means that the tubing or the sheet from which it is formed is of such consistency that it will lay flat when placed on a flat surface. The said lining may consist of a single tube or of a plurality of thin tubes laid over one another. In either case the thickness of the lining is such that the chemical conveyant will not permeate the wall of the lining and the thickness may therefore vary according to the substance to be conveyed. For most purposes a thickness sufficient to prevent permeability will be suitable with an average in the neighbourhood of ten thousandths of an inch. The hose may advantageously be built up on a mandrel on which the wire spiral is laid. The hose is preferably of rough bore construction, that is to say that the convolutions of the spiral are spaced apart and not compressed together.

In a preferred construction the inner lining is covered completely with woven polypropylene fabric which may be wound or laid thereon, the number of turns or plies of fabric depending on the pressure that the hose is required to resist. Above the layers of polypropylene fabric or above one such layer if there is only one, one or more layers of polypropylene film are disposed and upon the film one or more polypropylene layflat tubes are positioned. Over the layflat tubes an abrasive resistant coating is wrapped which may consist of polypropylene fabric coated with polyvinylchloride.

Finally the hose is wound with wire, normally of stainless steel but galvanised steel wire or plastic rod may be used, wound at the same pitch as the inner wire spiral of the hose but displaced half a pitch so that the outer wire lies midway between the turns of the inner spiral. The said outer wire may be coated with fluorinated ethylene propylene copolymer or polytetrafluoroethylene in like manner to the inner wire.

In a modification, where the hose is required to function in an area of high temperature which would be above the temperature suitable for polypropylene, the layers of polypropylene fabric, film and layflat tubing may be replaced by asbestos cloth or glass cloth or both. For example asbestos cloth may be used to replace polypropylene fabric and glass cloth, that is to say cloth made up of woven glass fibres, may replace the polypropylene film and layflat tubing. But glass cloth may replace some or all of the polypropylene fabric and asbestos cloth may replace some or all of the polypropylene layflat tubing. Alternatively, all the polypropylene fabric, film and layflat tubing may be replaced by either asbestos cloth or glass cloth.

In order that the invention may be clearly understood and readily carried into effect two embodiments thereof will now be described with reference to the accompanying drawings in which.

Figure 1:
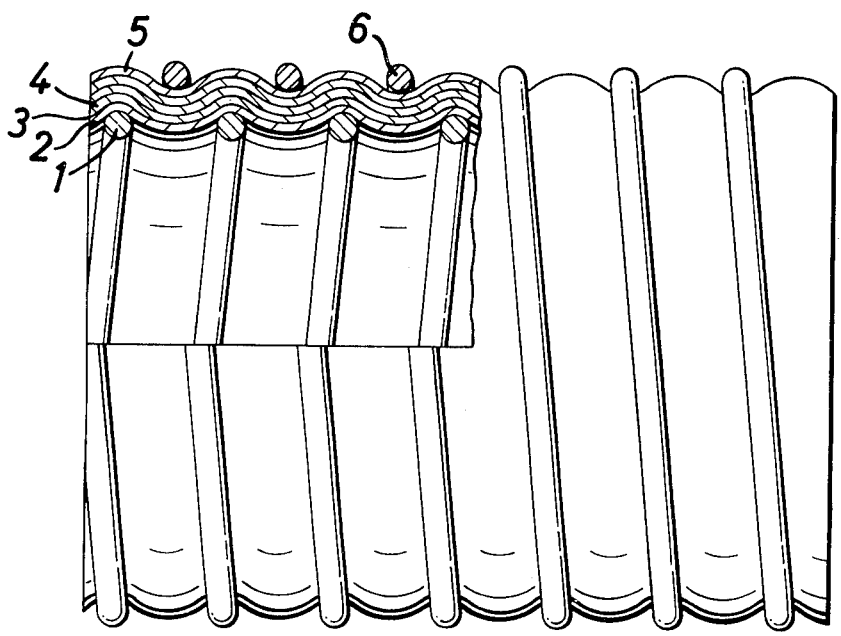
FIG. 1 is a side elevation partly in section of a length of hose according to the invention particularly adapted to the conveyance of chemical substances.

Referring to FIG. 1 an inner wire 1 preferably of stainless steel has superposed thereon one or more layers 2 of layflat tubing composed of fluorinated ethylene propylene copolymer. The inner wire 1 is preferably coated with fluorinated ethylene propylene copolymer or polytetrafluoroethylene. Upon the layers 2 is superposed a layer or layers of polypropylene fabric 3 upon which one or more layers of polypropylene layflat film 4 are laid. The whole is then encased in an outer cover of polypropylene coated with polyvinylchloride 5 which is wound round by a helix of wire 6 which may be of stainless steel, galvanised steel or plastic rod. As shown in the drawing the helix of the outer wire is spaced half a pitch from that of the inner wire so that the outer wire lies midway between the turns of the inner helix.

Figure 2:
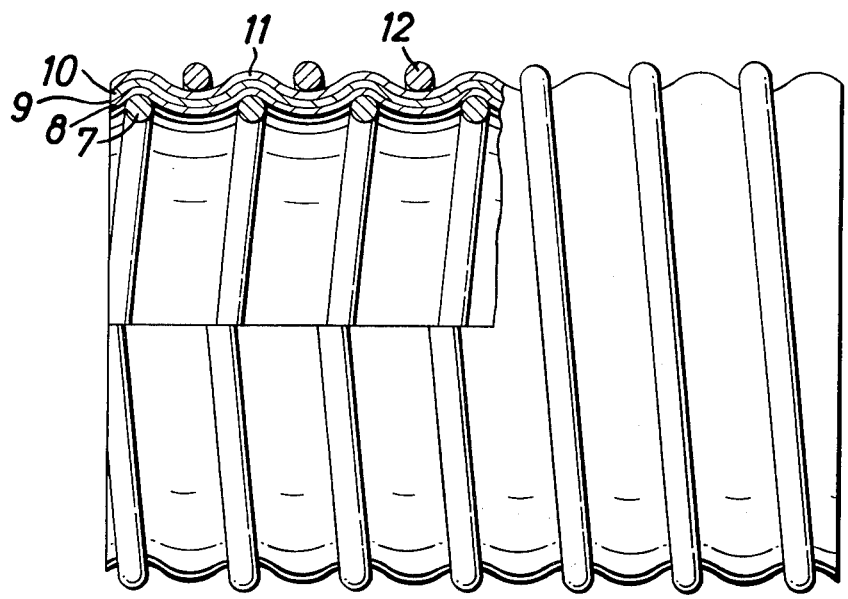
FIG. 2 is a side elevation partly in section of a length of hose according to the invention particularly adapted to the conveyance of substances at high temperatures.

Turning to FIG. 2 an inner wire 7 preferably of stainless steel and preferably coated with fluorinated ethylene propylene copolymer or polytetrafluoroethylene has superposed thereon one or more layers 8 of layflat tubing of fluorinated ethylene propylene copolymer. On this are superposed in succession one or more layers of asbestos fabric 9 and one or more layers of reinforcing polypropylene fabric 10. In each case only one layer is shown in the drawing. The whole is encased in an outer cover 11 of polypropylene fabric coated with polyvinylchloride round which is wound a wire helix 12 having its turns spaced half a pitch from those of the inner wire 7 as already described with reference to FIG. 1. The outer wire may be formed of stainless steel, galvanised steel or plastic rod. In lieu of asbestos fabric the layer or layers 9 may be formed of glass cloth.

In both constructions the hose is preferably built up on a mandrel on which the inner wire spiral is laid with its convolutions spaced apart and not pressed together. The inner lining of fluorinated ethylene propylene copolymer is then applied either by extrusion or in the form of sheet welded to form tubing. The polypropylene fabric or film may be wound from strip or laid as plies and the other layers may be similarly positioned.

What we claim is:

1. A process for the manufacture of hose or tube comprising: winding on a mandrel an inner wire coated with a material selected from the group consisting of fluorinated ethylene propylene copolymer and polytetrafluoroethylene, the convolutions of the winding being spaced apart; applying over the inner wire and the mandrel at least one layer of layflat tubing made of fluorinated ethylene propylene copolymer; applying over the layer of fluorinated ethylene propylene copolymer at least one layer of polypropylene fabric; applying over the layer of propylene fabric an outer cover of polypropylene fabric coated with polyvinyl chloride; and winding on an outer wire the turns of which are displaced half a pitch from the turns of the inner wire.

2. A process as in claim 1 including the step of applying at least one layer of asbestos cloth between the layer of layflat tubing and the layer of polypropylene fabric.

3. A process as in claim 1 including the step of applying at least one layer of polypropylene layflat film between the layer of polypropylene fabric and the outer cover.

* * * * *